United States Patent
Wang et al.

(10) Patent No.: US 11,763,135 B2
(45) Date of Patent: Sep. 19, 2023

(54) CONCEPT-BASED ADVERSARIAL GENERATION METHOD WITH STEERABLE AND DIVERSE SEMANTICS

(71) Applicant: Robert Bosch GmbH, Stuttgart (DE)

(72) Inventors: Zijie Wang, Atlanta, GA (US); Liang Gou, San Jose, CA (US); Wenbin He, Sunnyvale, CA (US); Liu Ren, Saratoga, CA (US)

(73) Assignee: Robert Bosch GmbH, Stuttgart (DE)

( * ) Notice: Subject to any disclaimer, the term of this patent is extended or adjusted under 35 U.S.C. 154(b) by 379 days.

(21) Appl. No.: 17/188,863

(22) Filed: Mar. 1, 2021

(65) Prior Publication Data
US 2022/0277187 A1    Sep. 1, 2022

(51) Int. Cl.
  *G06N 3/045* (2023.01)
  *G06N 3/088* (2023.01)
  *G06F 18/24* (2023.01)

(52) U.S. Cl.
  CPC .............. *G06N 3/045* (2023.01); *G06F 18/24* (2023.01); *G06N 3/088* (2013.01)

(58) Field of Classification Search
  CPC ...... G06N 3/045; G06N 3/088; G06N 3/0455; G06N 3/047; G06N 3/0475; G06N 3/094; G06N 3/08; G06N 20/00; G06N 3/084; G06N 3/04; G06F 18/24; G06F 18/214; G06F 18/217; G06F 18/2413; G06F 18/2148; G06V 10/82; G06V 40/172; G06V 10/764; G06V 20/56; G06V 10/774; G06V 20/70; G06V 30/19173; G06T 2207/20081; G06T 2207/20084; G06T 11/00;

(Continued)

(56) References Cited

U.S. PATENT DOCUMENTS

| | | | |
|---|---|---|---|
| 10,810,460 B2 * | 10/2020 | Ngo Dinh .............. | A61B 1/273 |
| 10,860,839 B2 * | 12/2020 | Weng ........................ | G06N 3/08 |
| 11,210,775 B1 * | 12/2021 | Wu ........................ | G06N 3/045 |
| 11,494,595 B2 * | 11/2022 | Wu ........................ | G06F 18/217 |

(Continued)

FOREIGN PATENT DOCUMENTS

EP    3767536 A1 *   1/2021   ............. G06F 17/18

OTHER PUBLICATIONS

Dupont, "Learning Disentangled Joint Continous and Discrete Representations", 32nd Conference on Neural Information Processing Systems, Oct. 2018, 16 pages.

(Continued)

*Primary Examiner* — Michael S Osinski
(74) *Attorney, Agent, or Firm* — Michael Best & Friedrich LLP

(57) ABSTRACT

Methods and systems for performing concept-based adversarial generation with steerable and diverse semantics. One system includes an electronic processor configured to access an input image. The electronic processor is also configured to perform concept-based semantic image generation based on the input image. The electronic processor is also configured to perform concept-based semantic adversarial learning using a set of semantic latent spaces generated as part of performing the concept-based semantic image generation. The electronic processor is also configured to generate an adversarial image based on the concept-based semantic adversarial learning. The electronic processor is also configured to test a target model using the adversarial image.

20 Claims, 6 Drawing Sheets

(58) Field of Classification Search
CPC .............. G06T 5/002; G06T 7/11; G06T 2207/10016; G06T 2207/30096
See application file for complete search history.

(56) References Cited

U.S. PATENT DOCUMENTS

| | | | | |
|---|---|---|---|---|
| 11,537,750 | B2* | 12/2022 | Klinkigt | G06T 5/002 |
| 11,640,532 | B2* | 5/2023 | Luss | G06V 10/764 382/159 |
| 2018/0365874 | A1* | 12/2018 | Hadap | G06V 40/16 |
| 2019/0147582 | A1* | 5/2019 | Lee | G06T 11/00 382/156 |
| 2019/0251401 | A1* | 8/2019 | Shechtman | G06V 10/82 |
| 2019/0251612 | A1* | 8/2019 | Fang | G06Q 30/0631 |
| 2019/0295302 | A1* | 9/2019 | Fu | G06V 10/82 |
| 2019/0385064 | A1* | 12/2019 | Malaya | G06N 3/084 |
| 2020/0210783 | A1* | 7/2020 | Okuno | G06N 3/047 |
| 2021/0089903 | A1* | 3/2021 | Murray | G06F 18/2132 |
| 2021/0216063 | A1* | 7/2021 | Götz | G05B 19/4183 |
| 2021/0241107 | A1* | 8/2021 | Jie | G06N 3/045 |
| 2021/0303925 | A1* | 9/2021 | Hofmann | G06V 20/56 |
| 2021/0342647 | A1* | 11/2021 | Gou | G06N 3/088 |
| 2021/0374553 | A1* | 12/2021 | Li | G06N 3/088 |
| 2022/0092742 | A1* | 3/2022 | Pei | G06T 5/002 |
| 2022/0121991 | A1* | 4/2022 | Kakizaki | G06N 3/08 |
| 2022/0122348 | A1* | 4/2022 | Pei | G06V 10/774 |
| 2022/0138897 | A1* | 5/2022 | Singh | G06T 7/73 382/159 |
| 2022/0277549 | A1* | 9/2022 | Ghafoorian | G06V 20/56 |
| 2022/0383052 | A1* | 12/2022 | Yin | G06F 18/24133 |
| 2023/0081128 | A1* | 3/2023 | Bau | G06T 7/11 382/173 |
| 2023/0084333 | A1* | 3/2023 | Clinchant | G06N 3/09 704/2 |

OTHER PUBLICATIONS

Goodfellow et al., "Generative Adversarial Networks," Advances in Neural Information Processing Systems, vol. 27, Jun. 2014, 9 pages.
Higgins et al., "beta-VAE: Learning basic visual concepts with a constrained variational framework," ICLR, 2017, 22 pages.
Karras et al., "A Style-Based Generator Architecture for Generative Adversarial Networks", Mar. 2019, 12 pgs.
Kingma et al., "Auto-Encoding Variational Bayes", ICLR, May 2014, 14 pages.
Lee et al., "High-Fidelity Synthesis with Disentangled Representation", European Conference on Computer Vision, Jan. 2020, 25 pages.
Li et al., "Learning the Distributions of Adversarial Examples for an Improved Black-Box Attack on Deep Neural Networks", Proceedings of the 36th International Conference on Machine Learning, Dec. 2019, 11 pages.
Madry et al., "Towards Deep Learning Models Resistant to Adversarial Attacks," ICLR, 2018, 23 pages.
McInnes et al., "UMAP: Uniform Manifold Approximation and Projection for Dimension Reduction", Sep. 2020, 63 pages.
Papemot et al., "Practical Black-Box Attacks Against Machine Learning", Proceedings of the 2017 ACM Asia Conference on Computer and Communications Security, Mar. 2017, 14 pages.
Szegedy et al., "Intriguing properties of neural networks," Feb. 2014, 10 pages.
Tuncali et al., "Simulation-based Adversarial Test Generation for Autonomous Vehicles with Machine Learning Components", IEEE Intelligent Vehicles Symposium, Jan. 2018, 17 pages.
Yi et al., "Generative Adversarial Network in Medical Imaging: A Review", Medical Image Analysis, vol. 58, Dec. 2019, 24 pages.

* cited by examiner

CONCEPT-BASED ADVERSARIAL GENERATION METHOD WITH STEERABLE AND DIVERSE SEMANTICS

FIELD

Embodiments relate to a concept-based adversarial generation method with steerable and diverse semantics.

SUMMARY

It is challenging to efficiently generate test cases to assess and validate the performance of complicated artificial intelligence ("AI") models, such as deep neural network ("DNN") based image classifiers, object detectors, and the like. For example, in the medical imaging community, researchers use generative adversarial networks ("GANs") to generate new images, such as brain magnetic resonance images, to validate trained image classification models. As diagnostic medical images are expensive to collect, GANs provide an efficient way to generate realistic new test images. As another example, in the autonomous driving domain, it is pivotal to test trained AI models in diverse scenarios before deploying the AI models in autonomous driving systems at a large scale. However, it is challenging to collect diverse real-life traffic data. Therefore, three-dimensional ("3D") simulation-based methods are used to generate test cases for autonomous driving AI models, such as, for example, a DNN-based pedestrian detector.

Recent advancements for deep generation models and adversarial attacks show promising directions for such test case generation. Deep generative models may generate a large volume of test cases that resemble real-word data. As one example, StyleGAN, a deep GAN model, is able to generate fake human portraits that looks deceptively like real human faces. Adversarial attack approaches may efficiently probe weak spots of a machine learning model. As one example of an adversarial attack on a DNN model, injecting small and human-imperceptible noise into input images (for example, a "smiling face" image) may easily fool the DNN model into making wrong predictions (for example, classifying the input image as a "not smiling face" image).

Despite recent advancements of deep generation models and adversarial attacks for such test case generation, there are several challenges to generate meaningful test cases using adversarial attack methods to assess and validate DNN models. For example, such challenges include how to generate meaningful test cases with interpretable high-level concepts, how to understand and steer (or tune) the concepts for adversarial generation, how to generate diverse test cases for a broad test coverage, and the like.

With respect to generating meaningful test cases with interpretable high-level concepts, it is challenging to generate adversarial test cases with interpretable high-level concepts. As noted above, a traditional adversarial attack method finds small random noises that significantly changes the model classification. These methods aim to minimize the noise so that humans cannot perceive the noise. However, this leads to a generated adversarial example looking the same as the original image. Therefore, the noise and the generated adversarial examples do not reflect realistic phenomena (such as lighting and background color) or have semantic meanings (such as hair style and wearing glasses). In other words, people cannot generalize the weakness of DNN models from the traditional adversarial test cases to real-life scenarios.

With respect to understanding and steering the concepts for adversarial generation, it takes non-trivial efforts to understand and steer (or tune) the concepts for adversarial generation. To comprehensively test AI models, machine learning engineers need to easily interpret and control the test case generation. However, the generative model GAN is considered a black-box model, where it is challenging for users to make sense or control the generation process. Therefore, it is difficult to intuitively generate test cases with desired properties.

With respect to generating diverse test cases, the method of generating diverse adversarial test cases is desirable to have a broad test coverage. To test AI models under different use scenarios, generated test cases need to have diverse properties. With the current generation methods, test cases tend to have uniform features that cannot cover broad real-life scenarios.

To solve these and other problems, the embodiments described herein provide, among other things, methods and systems for performing concept-based adversarial generation with interpretable, steerable, and diverse semantics. The embodiments described herein include components of concept-based semantic image generation, concept-based semantic based adversarial test case generation, and semantic adversarial analysis. Accordingly, the embodiments described herein enable concept-based adversarial generation that efficiently generates diverse test data with interpretable and steerable semantics.

Accordingly, the embodiments described herein advantageously provide for a concept-based adversarial generation framework with a disentangle representation learning and a generative adversarial network, a generation framework with separated high-level concepts and low-level imperviable features in the latent space, a black-box adversarial attack approach to generate concept-based adversarial results without knowing the parameters of a targeted model, a steerable attack method to generate diverse results by balancing the high-level concepts and low-level imperviable features, and a visual summarization to gain actionable insights of the generated adversarial patterns.

For example, one embodiment provides a system for performing concept-based adversarial generation with steerable and diverse semantics. The system includes an electronic processor configured to access an input image. The electronic processor is also configured to perform concept-based semantic image generation based on the input image. The electronic processor is also configured to perform concept-based semantic adversarial learning using a set of semantic latent spaces generated as part of performing the concept-based semantic image generation. The electronic processor is also configured to generate an adversarial image based on the concept-based semantic adversarial learning. The electronic processor is also configured to test a target model using the adversarial image.

Another embodiment provides a method for performing concept-based adversarial generation with steerable and diverse semantics. The method including accessing an input image. The method also includes performing, with an electronic processor, concept-based semantic image generation based on the input image. The method also includes performing, with the electronic processor, concept-based semantic adversarial learning using a set of semantic latent spaces generated as part of performing the concept-based semantic image generation. The method also includes generating, with the electronic processor, an adversarial image based on the concept-based semantic adversarial learning. The method also includes testing, with the electronic processor, a target model using the adversarial image. The method also includes generating, with the electronic processor, a performance summary of the target model for display.

Yet another embodiment provides a non-transitory, computer-readable medium storing instructions that, when executed by an electronic processor, perform a set of functions. The set of functions includes accessing an input image. The set of functions also includes performing concept-based semantic image generation based on the input image. The set of functions also includes performing concept-based semantic adversarial learning using a set of semantic latent spaces generated as part of performing the concept-based semantic image generation. The set of functions also includes generating an adversarial image based on the concept-based semantic adversarial learning. The set of functions also includes testing a target model using the adversarial image. The set of functions also includes generating a performance summary of the target model for display.

Other aspects and embodiments will become apparent by consideration of the detailed description and accompanying drawings.

DETAILED DESCRIPTION

Before any embodiments are explained in detail, it is to be understood the embodiments are not limited in their application to the details of construction and the arrangement of components set forth in the following description or illustrated in the following drawings. Other embodiments are possible and embodiments described and/or illustrated here are capable of being practiced or of being carried out in various ways.

It should also be noted that a plurality of hardware and software-based devices, as well as a plurality of different structural components may be used to implement the embodiments described herein. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the embodiments described herein may be implemented in software (for example, stored on non-transitory computer-readable medium) executable by one or more electronic processors. As such, it should be noted that a plurality of hardware and software-based devices, as well as a plurality of different structural components may be utilized to implement various embodiments. It should also be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links.

Figure 1:
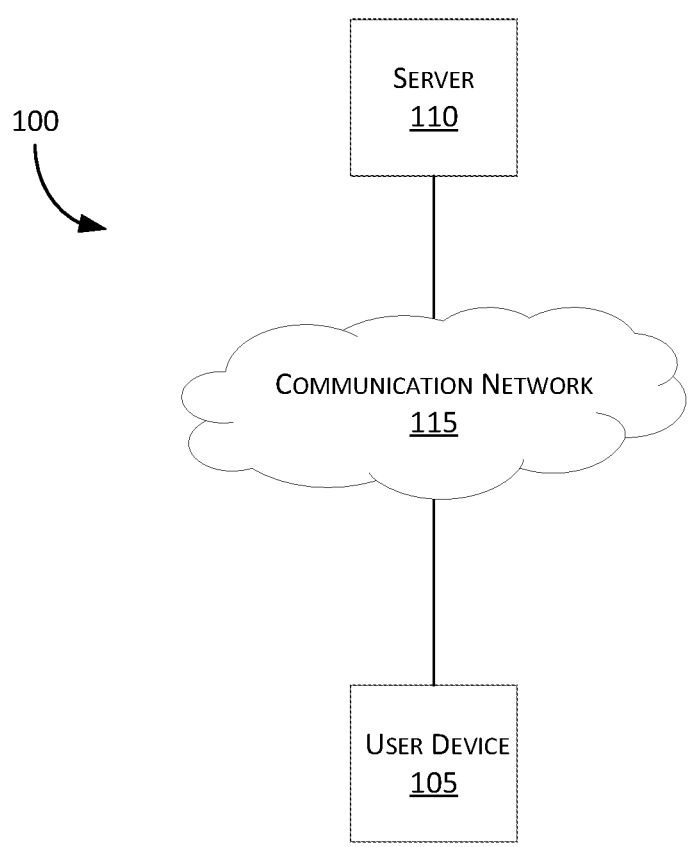
FIG. 1 schematically illustrates a system for performing concept-based adversarial generation with steerable and diverse semantics according to some embodiments.

FIG. 1 illustrates a system 100 for performing concept-based adversarial generation according to some embodiments. In the illustrated example, the system 100 includes a user device 105 and a server 110. In some embodiments, the system 100 includes fewer, additional, or different components than illustrated in FIG. 1. For example, the system 100 may include multiple user devices 105, multiple servers 110, or a combination thereof.

The user device 105 and the server 110 communicate over one or more wired or wireless communication networks 115. Portions of the communication networks 115 may be implemented using a wide area network, such as the Internet, a local area network, such as a Bluetooth™ network or Wi-Fi, and combinations or derivatives thereof. Alternatively or in addition, in some embodiments, components of the system 100 communicate directly with each other instead of communicating through the communication network 115. Also, in some embodiments, the components of the system 100 communicate through one or more intermediary devices not illustrated in FIG. 1.

Figure 2:
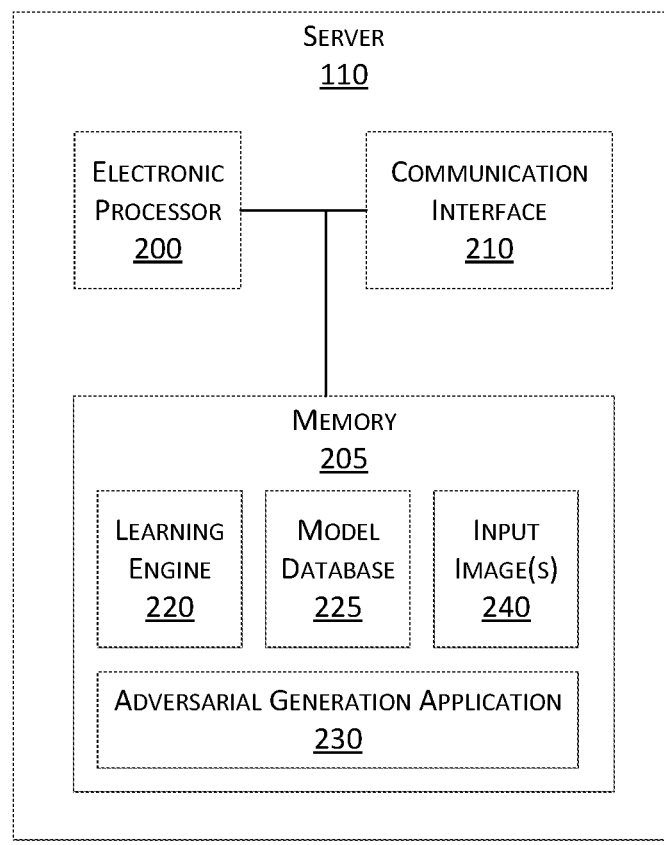
FIG. 2 schematically illustrates a server included in the system of FIG. 1 according to some embodiments.

The server 110 includes a computing device, such as a server, a database, or the like. As illustrated in FIG. 2, the server 110 includes an electronic processor 200, a memory 205, and a communication interface 210. The electronic processor 200, the memory 205, and the communication interface 210 communicate wirelessly, over one or more communication lines or buses, or a combination thereof. The server 110 may include additional components than those illustrated in FIG. 2 in various configurations. For example, the server 110 may also include one or more human machine interfaces, such as a keyboard, keypad, mouse, joystick, touchscreen, display device, printer, speaker, and the like, that receive input from a user, provide output to a user, or a combination thereof. The server 110 may also perform additional functionality other than the functionality described herein. Also, the functionality described herein as being performed by the server 110 may be distributed among multiple servers or devices (for example, as part of a cloud service or cloud-computing environment).

The communication interface 210 may include a transceiver that communicates with the user device 105 over the communication network 115 and, optionally, one or more other communication networks or connections. The electronic processor 200 includes a microprocessor, an application-specific integrated circuit ("ASIC"), or another suitable electronic device for processing data, and the memory 205 includes a non-transitory, computer-readable storage medium. The electronic processor 200 is configured to access and execute computer-readable instructions ("software") stored in the memory 205. The software may include firmware, one or more applications, program data, filters, rules, one or more program modules, and other executable instructions. For example, the software may include instructions and associated data for performing a set of functions, including the methods described herein.

For example, as illustrated in FIG. 2, the memory 205 may store a learning engine 220 and a model database 225. In some embodiments, the learning engine 220 develops one or more deep learning models using one or more machine learning functions. Machine learning functions are generally functions that allow a computer application to learn without being explicitly programmed. In particular, the learning engine 220 is configured to develop an algorithm or model based on training data. For example, to perform supervised learning, the training data includes example inputs and corresponding desired (for example, actual) outputs, and the learning engine progressively develops a model (for example, a deep learning model, such as an object detection model, a semantic segmentation model, or the like) that maps inputs to the outputs included in the training data. Machine learning performed by the learning engine 220 may be performed using various types of methods and mechanisms including, but not limited to, decision tree learning, association rule learning, artificial neural networks, inductive logic programming, support vector machines, clustering, Bayesian networks, reinforcement learning, representation learning, similarity and metric learning, sparse dictionary learning, and genetic algorithms. These approaches allow the learning engine 220 to ingest, parse, and understand data and progressively refine models for data analytics.

Models generated by the learning engine 220 are stored in the model database 225. Models stored in the model database 225 may include, for example, an image classification model, an object detection model, a DNN-based pedestrian detection model, and the like. As illustrated in FIG. 2, the model database 225 is included in the memory 205 of the server 110. However, in some embodiments, the model database 225 is included in a separate device accessible by the server 110 (included in the server 110 or external to the server 110).

Additionally, as illustrated in FIG. 2, the memory 205 includes an adversarial generation application 230. The adversarial generation application 230 is a software application executable by the electronic processor 200. As described in more detail below, the electronic processor 200 executes the adversarial generation application 230 for performing concept-based adversarial generation that efficiently generates diverse test data with interpretable and steerable semantics. For example, as described in greater detail below, in some embodiments, the adversarial generation application 230 performs concept-based semantic image generation and performs concept-based semantic adversarial learning for generating one or more adversarial examples or images. The adversarial generation application 230 may use the one or more adversarial examples or images to perform model testing and semantic adversarial analytics.

Figure 3A:
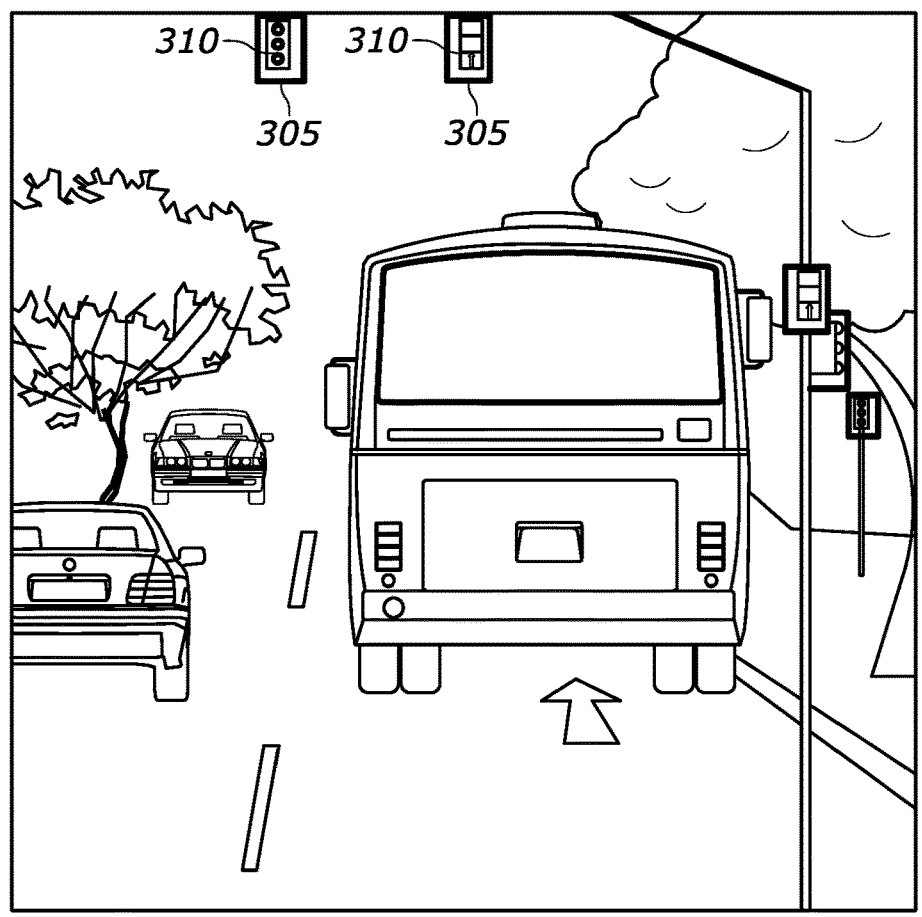
FIGS. 3A-3B illustrate example input images
Figure 3B:
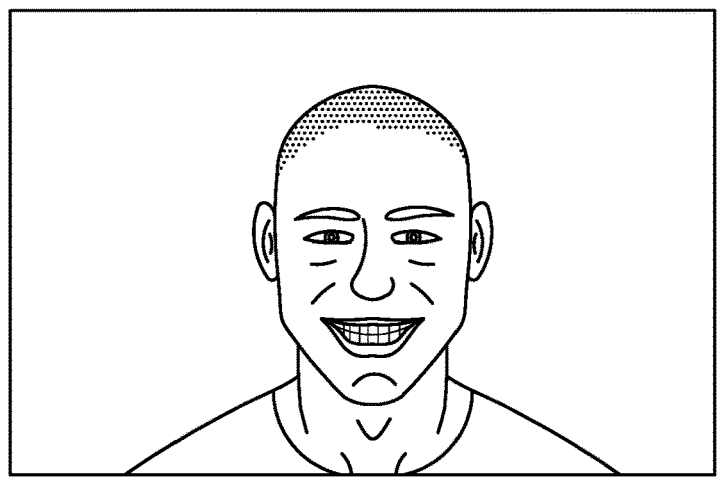

The memory 205 also includes a collection or set of input images 240. FIGS. 3A and 3B illustrate example input images 240. As one example, FIG. 3A illustrates a driving scene as an example input image 240. As seen in FIG. 3A, the driving scene includes a plurality of bounding boxes 305, where each bounding box 305 is associated with a corresponding object 310. In some embodiments, a deep learning model (for example, a model stored in the model database 225) recognizes or identify an object 310 in a driving scene and positions or generates a bounding box 305 around the object 310. As yet another example, FIG. 3B illustrates a human portrait as an example input image 240. Although FIG. 2 illustrates the input image(s) 240 included in the memory 205 of the server 110, in some embodiments, the input image(s) 240 are included in a separate device accessible by the server 110 (included in the server 110 or external to the server 110).

The user device 105 also includes a computing device, such as a desktop computer, a laptop computer, a tablet computer, a terminal, a smart telephone, a smart television, a smart wearable, or another suitable computing device that interfaces with a user. The user device 105 may be used by an end user to interact with the adversarial generation application 230. In some embodiments, the end user may interact with the adversarial generation application 230 to perform function testing that examines the performance (for example, a robustness and a potential vulnerability) of a deep learning model (for example, a target deep learning model), as described in greater detail below. Alternatively or in addition, the end user may use the user device 105 to interact with function testing results, such as a performance summary of the function testing (or adversarial attack) results, provided by the adversarial generation application 230, as described in greater detail below. For example, in some embodiments, the adversarial generation application 230 generates or provides a visual analytics tool accessible by an end user for performing model testing and semantic adversarial analytics.

Although not illustrated in FIG. 1, the user device 105 may include similar components as the server 110, such as electronic processor (for example, a microprocessor, an ASIC, or another suitable electronic device), a memory (for example, a non-transitory, computer-readable storage medium), a communication interface, such as a transceiver, for communicating over the communication network 115 and, optionally, one or more additional communication networks or connections, and one or more human machine interfaces. For example, to communicate with the server 110, the user device 105 may store a browser application or a dedicated software application executable by an electronic processor. The system 100 is described herein as providing a function testing service through the server 110. However, in other embodiments, the functionality described herein as being performed by the server 110 may be locally performed by the user device 115. For example, in some embodiments, the user device 105 may store the adversarial generation application 230.

Figure 4:
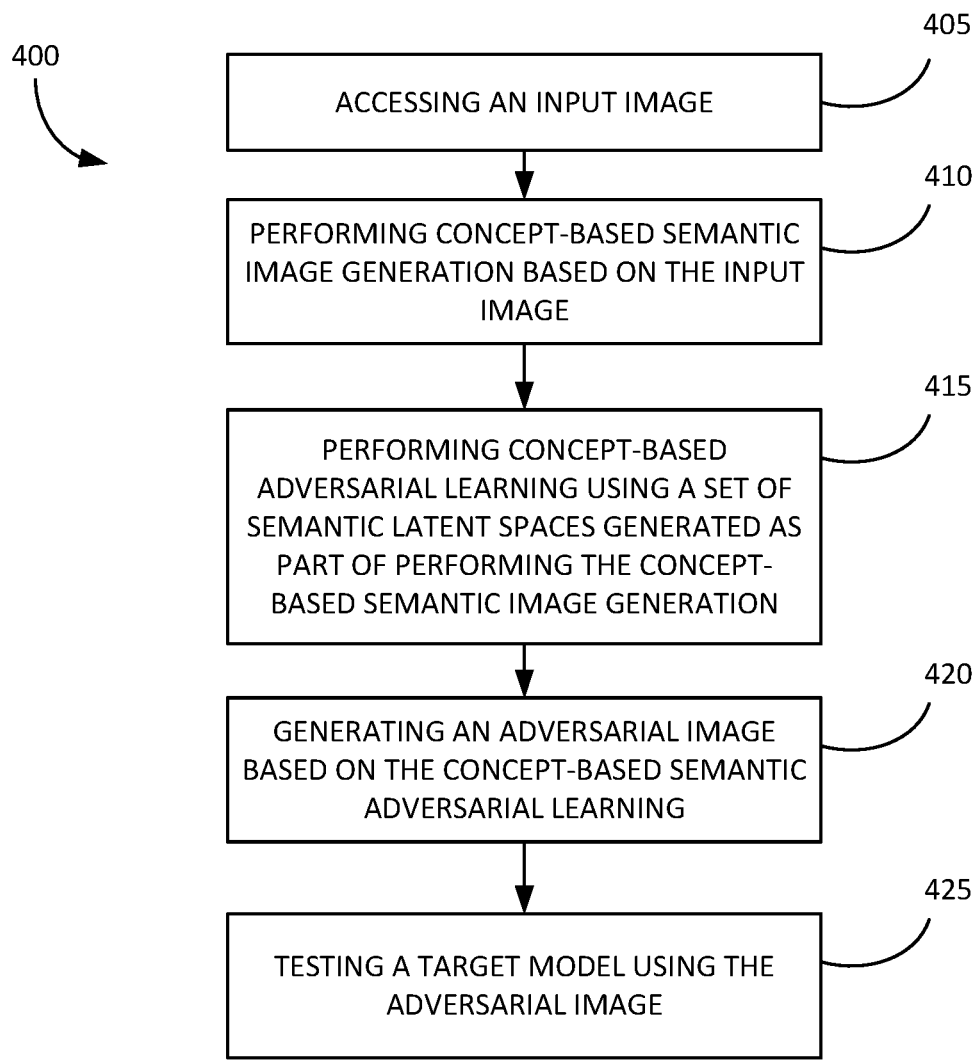
FIG. 4 is a flowchart illustrating a method for performing concept-based adversarial generation with steerable and diverse semantics performed by the system of FIG. 1 according to some embodiments.

FIG. 4 is a flowchart illustrating a method 400 for performing concept-based adversarial generation performed by the system 100 according to some embodiments. The method 400 is described as being performed by the server 110 and, in particular, the adversarial generation application 230 as executed by the electronic processor 200. However, as noted above, the functionality described with respect to the method 400 may be performed by other devices, such as the user device 105, or distributed among a plurality of devices, such as a plurality of servers included in a cloud service.

As illustrated in FIG. 4, the method 400 includes accessing an input image 240 (at block 405). In some embodiments, the electronic processor 200 accesses the input image(s) 240 from the memory 205. Alternatively or in addition, the electronic processor 200 may access the input image(s) 240 from a separate device accessible by the server 110 (included in the server 110 or external to the server 110, such as a separate database).

After accessing the input image 240 (at block 405), the electronic processor 200 performs concept-based semantic image generation based on the input image 240 (at block 410). In some embodiments, the electronic processor 200 performs concept-based semantic image generation using disentangled representation learning and generative adversarial learning. Accordingly, in some embodiments, the electronic processor 200 trains a semantic image generator using an approach combining disentangled representation learning (such as, for example, a variational autoencoder, a beta—variational autoencoder, or the like) and generative adversarial learning (such as, for example, a GAN). The learned disentangled latent space (for example, the trained semantic image generator) encodes both continuous and categorical features or dimensions. An end user may use the learned disentangled latent space to encode high-level concepts and generate high-fidelity fake images in a semantic manner. Accordingly, in some embodiments, the electronic processor 200 performs the concept-based semantic image generation by training an image generator with disentangled continuous and discrete representation and training a generative adversarial network based on a semantic latent space disentangled by the image generator.

The electronic processor 200 may train the image generator with disentangled continuous and discrete representation (i.e., with interpretable latent representation). In some embodiments, the electronic processor 200 trains the image generator as a variational autoencoder (for example, a disentangled representation model). In some embodiments, the electronic processor 200 trains the image generator by learning a disentangled latent space (for example, of the input image 240) with both continuous and discrete encodings and aligns the latent space with semantic features (for example, as an encoder). Then, the image generator may generate one or more new images from this semantic latent space (for example, as a decoder). Therefore, as generate adversarial examples or images are generated (as described in greater detail below), the semantics of the generated adversarial images may be easily controlled and understood. Accordingly, in some embodiments, the electronic processor 200 trains the image generator by training an encoder to learn a disentangled latent space with continuous and discrete encodings (for example, of the input image) and align the disentangled latent space with semantic features as a semantic latent space and training a decoder to generate a new image from the semantic latent space.

Figure 5:
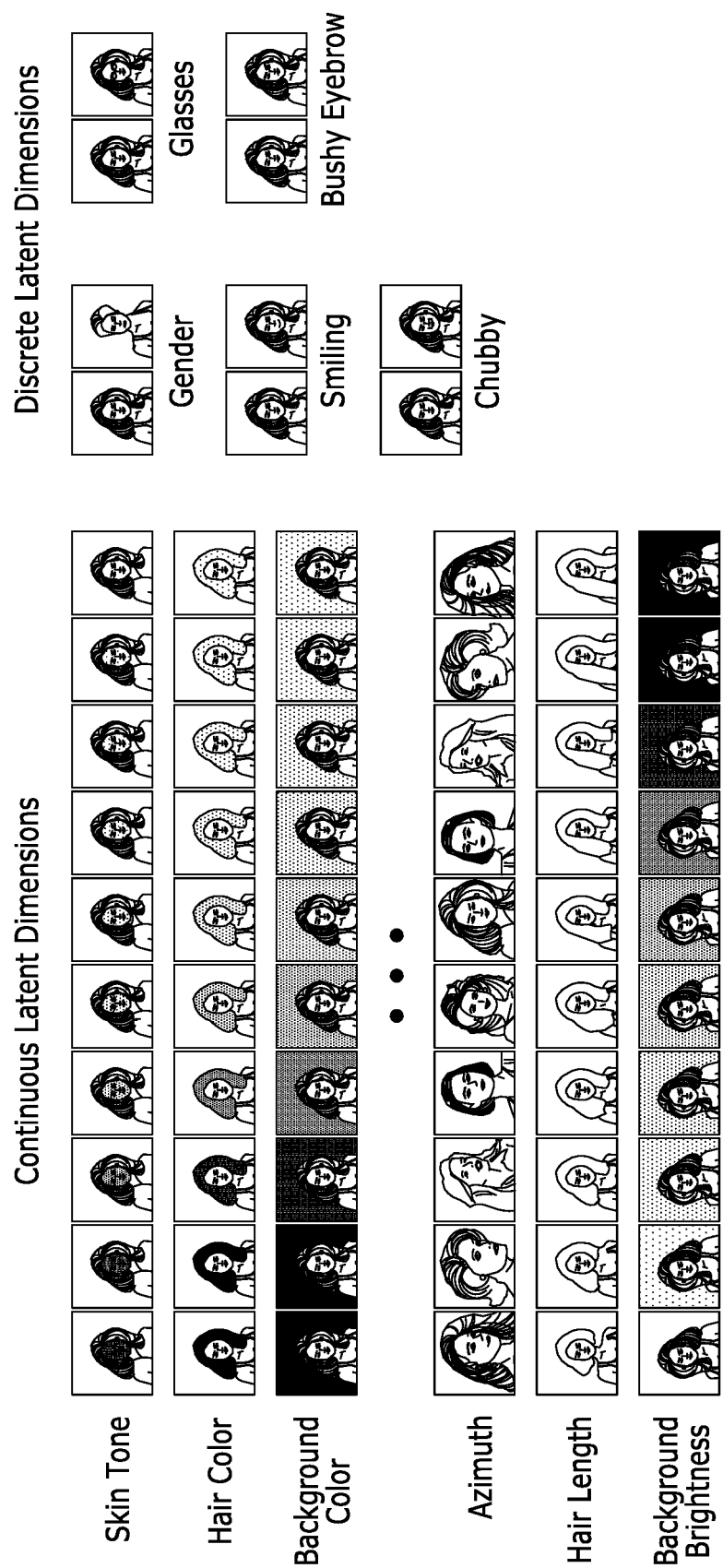
FIG. 5 illustrates a visualization of a trained variational autoencoder semantic latent space that includes both continuous latent dimensions and discrete latent dimensions according to some embodiments.

As one example, FIG. 5 illustrates a visualization of a trained variational autoencoder semantic latent space that includes both continuous latent dimensions and discrete latent dimensions (in the context of a human facial attribute classification use case). As seen in FIG. 5, a continuous latent dimension may be trained to represent azimuth (i.e., an orientation of the face) and a discrete latent dimension (or a binary categorical dimension) may be trained to represent glasses (for example, a 1 if the person is wearing glasses and a 0 if the person is not wearing glasses). In the example illustrated in FIG. 5, a continuous latent dimension may include, for example, a skin tone, a hair color, a background color, an azimuth, a hair length, a background brightness, and the like. A discrete latent dimension may include, for example, a gender, a presence of glasses, a presence of a smile, an eyebrow characteristic, a weight characteristic, and the like. Having semantic latent space enables an end user to easily control adversarial image generation using high-level concepts. As one example, an end user may easily generate an image (for example, an adversarial image) of a smiling human face without glasses turning left by 30 degrees.

After training the image generator (for example, a variational autoencoder) and disentangling a semantic latent space, the electronic processor 200 trains a GAN (for example, a GAN model) with random input and a vector sampled from the semantic latent space (for example, the disentangled semantic latent space). In comparison to a variational autoencoder, the GAN model may generate more realistic-looking and high-fidelity images (for example, GAN-generated images). Distinct from traditional GAN models, in some embodiments, the GAN model trained by the electronic processor 200 enables users to use the latent space vector with both continuous and discrete dimensions to control semantics of the GAN-generated images. Accordingly, the method 400 (as executed by the electronic processor 200) supports continuous latent space as well as categorical (or discrete) latent space. With reference to FIG. 5, the images generated by the GAN model (where, in each row, one semantic latent space dimension is traversed) look similar to realistic images and the semantic properties (for example, background color, hair length) may be controlled.

Returning to FIG. 4, the electronic processor 200 then performs concept-based semantic adversarial learning using a set of semantic latent spaces generated as part of performing the concept-based semantic image generation (at block 415). Accordingly, in some embodiments, the electronic processor 200 identifies one or more semantic latent space samples that may be used to generate one or more adversarial images. An adversarial image may include, for example, a new fake test image that fools or fails a target model, such as a facial attribute classifier.

In some embodiments, the electronic processor 200 implements a black-box adversarial learning approach (for example, an approach that works on various target classifiers without needing to know the inner workings of the target model). In some embodiments, the electronic processor 200 searches small noises in the image space in order to identify one or more semantic latent space samples that may be used to generate an adversarial image. Alternatively or in addition, the electronic processor 200 may search through semantic latent space with both continuous and categorical dimensions.

Figure 6:
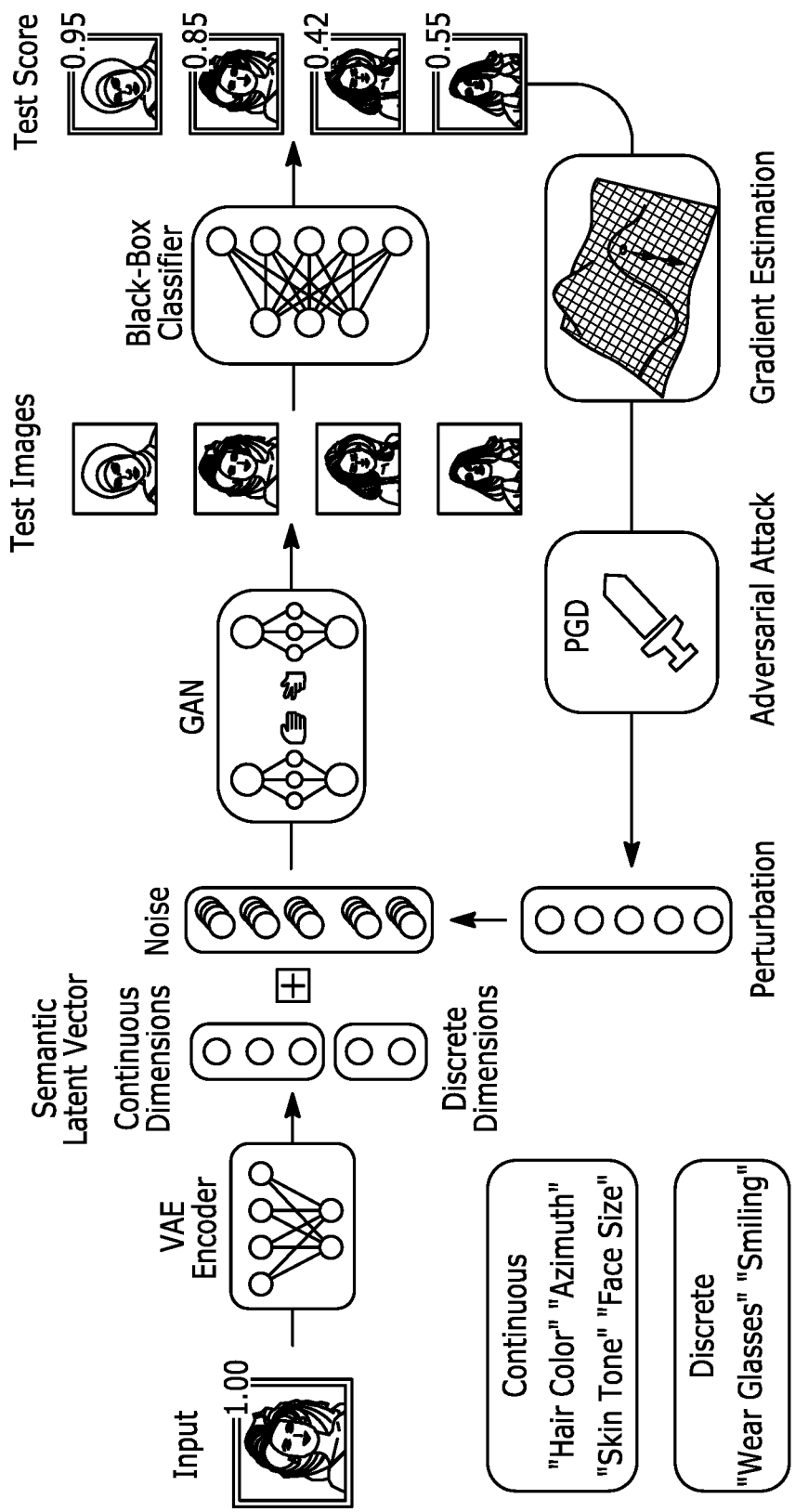
FIG. 6 illustrates semantic adversarial learning with block-box queries according to some embodiments.

FIG. 6 illustrates semantic adversarial learning with block-box queries according to some embodiments. As shown in FIG. 6, for a specific input image, the electronic processor 200 attempts to generate an adversarial image where the target facial attribute classifier (for example, a target model) gives a different prediction. The adversarial image is expected to look similar to the input image but have semantic differences. As seen in FIG. 6, the electronic processor 200 encodes the input image into the semantic latent space with the image generator (illustrated in FIG. 6 as a "VAE encoder"). Then, the electronic processor 200 adds small random noises to the latent mean vector and uses the perturbed latent vectors to generate new test images (for example, adversarial images) using GAN. Next, by feeding a small set of test images into the target classifier (for example, the target model), the electronic processor 200 may approximate the gradient (illustrated in FIG. 6 as a "Gradient Estimation") of the target classifier loss function in terms of the semantic latent space distribution. Using a projected gradient descent ("PGD") adversarial attack approach, the electronic processor 200 may efficiently find a latent vector with small semantic modification that leads to an adversarial example or image. In some embodiments, the electronic processor 200 continues this process until at least on adversarial image is generated, a limited query budget is met, or the like.

Accordingly, as seen in the example provided in FIG. 4, the electronic processor generates an adversarial image based on the concept-based semantic adversarial learning (at block 420) and, using the adversarial image, the electronic processor 200 may then test a target model (at block 425). Accordingly, after performing the concept-based semantic image generation (at block 410) and performing concept-based semantic adversarial learning (at block 415), the electronic processor 200 may efficiently generate one or more realistic and semantic adversarial examples or images. The electronic processor 200 may use the adversarial images to test a target model (for example, a model included in the model database 225) to, for example, discover edge cases, identify model vulnerabilities, or the like. Alternatively or in addition, the electronic processor 200 may semantically analyze and summarize a robustness of the target model through, for example, an interactive visual analytics tool (for example, provided by or as part of the adversarial generation application 230).

In some embodiments, the electronic processor 200 generates a performance summary of the target model for display (at block 430). The performance summary may be based on the testing of the target model. For example, the performance summary may include information relating to a discovered edge case, a model vulnerability, a robustness of the target model, or the like. In some embodiments, the electronic processor 200 generates and transmits the performance summary to the user device 105 for display via, for example, a visual analytics tool accessible by the user device 105. Accordingly, an end user may interact with the performance summary (for example, through a visual analytics tool accessible by the user device 105) to interactively compare different representations (for example, in variational autoencoder latent space, classifier feature space, and the like) to gain actionable insights regarding, for example, a robustness of the target model.

Accordingly, the embodiments described herein provide an interpretable and steerable framework for generating new realistic and diverse test images (for example, adversarial examples or images) where a trained AI model (for example, a target model) fails to correctly predict, for example, an attribute. In particular, the embodiments described herein learn a semantic adversarial generator with a combination of disentangled representation learning based approach (such as variational autoencoders) and a GAN. The embodiments described herein use an adversarial attack approach (for example, a black-box adversarial attack approach) to generate new test images (for example, adversarial examples or images) where the target model does not perform well. The embodiments described herein then summarize and analyze the adversarial examples and test results (for example, using a visual analytics tool).

Thus, the embodiments provide, among other things, methods and systems for performing concept-based adversarial generation that efficiently generates diverse test data with interpretable and steerable semantics. Various features and advantages of certain embodiments are set forth in the following claims.

What is claimed is:

1. A system for performing concept-based adversarial generation with steerable and diverse semantics, the system comprising:
    an electronic processor configured to
        access an input image,
        perform concept-based semantic image generation based on the input image,
        perform concept-based semantic adversarial learning using a set of semantic latent spaces generated as part of performing the concept-based semantic image generation,
        generate an adversarial image based on the concept-based semantic adversarial learning, and
        test a target model using the adversarial image.

2. The system of claim 1, wherein the electronic processor is configured to perform concept-based semantic image generation using disentangled representation learning and generative adversarial learning.

3. The system of claim 1, wherein the electronic processor is configured to perform concept-based semantic image generation by
    training an image generator with disentangled continuous and discrete representation, and
    training a generative adversarial network based on a semantic latent space disentangled by the image generator.

4. The system of claim 3, wherein the image generator is a variational autoencoder.

5. The system of claim 3, wherein the training the image generator includes
    training an encoder configured to
        learn a disentangled latent space with continuous and discrete encodings, and
        align the disentangled latent space with semantic features as the semantic latent space.

6. The system of claim 3, wherein training the image generator also includes
    training a decoder configured to generate a new image from the semantic latent space.

7. The system of claim 3, wherein the electronic processor is configured to train the generative adversarial network with random input and a vector sampled from the semantic latent space.

8. The system of claim 1, wherein the concept-based semantic adversarial learning is performed as a black-box adversarial learning approach.

9. The system of claim 1, wherein the electronic processor is configured to perform the concept-based semantic adversarial learning by
    analyzing the set of semantic latent spaces, and
    identifying at least one semantic latent space,
    wherein the adversarial image is generated based on the at least one semantic latent space.

10. The system of claim 9, wherein the adversarial image has at least one semantic feature different than the input image.

11. The system of claim 1, wherein the adversarial image will fail the target model.

12. The system of claim 11, wherein the target model is an attribute classifier.

13. The system of claim 1, wherein the electronic processor is further configured to generate a performance summary of the target model for display.

14. A method for performing concept-based adversarial generation with steerable and diverse semantics, the method comprising:
    accessing an input image;
    performing, with an electronic processor, concept-based semantic image generation based on the input image;
    performing, with the electronic processor, concept-based semantic adversarial learning using a set of semantic latent spaces generated as part of performing the concept-based semantic image generation;
    generating, with the electronic processor, an adversarial image based on the concept-based semantic adversarial learning;
    testing, with the electronic processor, a target model using the adversarial image; and generating, with the electronic processor, a performance summary of the target model for display.

15. The method of claim 14, wherein performing concept-based semantic image generation includes performing the concept-based semantic image generation using disentangled representation learning and generative adversarial learning.

16. The method of claim 14, wherein performing the concept-based semantic image generation includes
   training an image generator with disentangled continuous and discrete representation, and
   training a generative adversarial network based on a semantic latent space disentangled by the image generator.

17. The method of claim 16, wherein the training the image generator includes
   training an encoder configured to
      learn a disentangled latent space with continuous and discrete encodings, and
      align the disentangled latent space with semantic features as the semantic latent space; and
   training a decoder configured to generate a new image from the semantic latent space.

18. The method of claim 14, wherein performing the concept-based semantic adversarial learning includes
   analyzing the set of semantic latent spaces, and
   identifying at least one semantic latent space,
   wherein the adversarial image is generated based on the at least one semantic latent space.

19. A non-transitory, computer-readable medium storing instructions that, when executed by an electronic processor, perform a set of functions, the set of functions comprising:
   accessing an input image;
   performing concept-based semantic image generation based on the input image;
   performing concept-based semantic adversarial learning using a set of semantic latent spaces generated as part of performing the concept-based semantic image generation;
   generating an adversarial image based on the concept-based semantic adversarial learning;
   testing a target model using the adversarial image; and
   generating a performance summary of the target model for display.

20. The computer-readable medium of claim 19, wherein performing the concept-based semantic image generation includes
   training an image generator with disentangled continuous and discrete representation, and
   training a generative adversarial network based on a semantic latent space disentangled by the image generator.

* * * * *